UNITED STATES PATENT OFFICE.

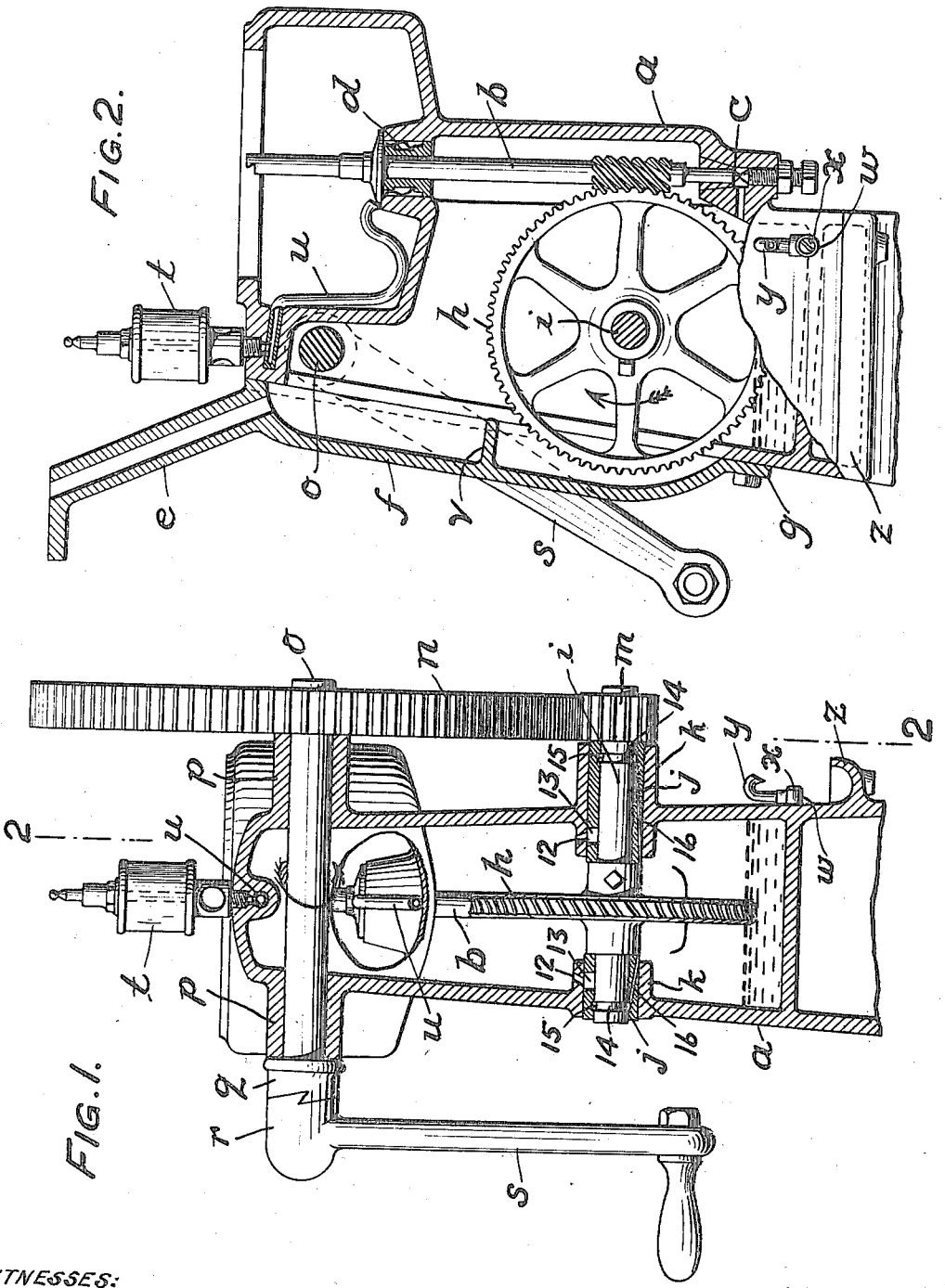

THEODORE H. MILLER, OF POUGHKEEPSIE, NEW YORK, ASSIGNOR TO THE DE LAVAL SEPARATOR COMPANY, A CORPORATION OF NEW JERSEY.

OILING MEANS FOR SHAFT-BEARINGS.

1,158,530.  Specification of Letters Patent.  Patented Nov. 2, 1915.

Original application filed June 12, 1913, Serial No. 773,158. Divided and this application filed March 16, 1914. Serial No. 324,893.

*To all whom it may concern:*

Be it known that I, THEODORE H. MILLER, a citizen of the United States, residing at Poughkeepsie, county of Dutchess, and State of New York, have invented a new and useful Improvement in Oiling Means for Shaft-Bearings, of which the following is a full, clear, and exact description, reference being had to the accompanying drawings, which form a part of this specification.

This application is a division of an application filed by me June 12, 1913, Serial No. 773,158.

The object of the invention is to provide means for oiling the shaft bearings.

While the invention is of general application, its more specific object is to provide means for use in connection with a splash oil system for the driving mechanism of a centrifugal separator, whereby the outer bearings for the shafts, and particularly the comparatively rapidly rotating worm wheel shaft, may be effectively oiled, from the inside of the casing, without leakage of the oil beyond the bearings and therefore without waste of clean oil.

In the drawings: Figure 1 is a side view, largely in section, of the driving mechanism of a centrifugal cream separator, together with the casing and splash oil system, with my invention applied thereto. Fig. 2 is a vertical section on the line 2—2 of Fig. 1.

The spindle of the centrifugal separator bowl (not shown) is connected to the upper end of a worm shaft $b$. The lower extremity of the shaft $b$ rests on a step-bearing $c$ within the casing $a$, while the upper end part of the spindle extends through a top bearing $d$. The lower part of the casing constitutes an oil reservoir. The rear wall of the casing is provided with a vertically extending slotted opening to which is applied the cover plate $f$ of a casting, said plate being of channel-shape open along one side to fit over the opening in the casing and provided with flanges $g$, along the sides and lower end, bolted to the casing. The upper part of the casting consists of a tube $e$. The oil reservoir is initially filled to the desired level through the tube $e$.

The worm shaft $b$ is driven from a worm wheel $h$ on the shaft $i$ extending horizontally across the casing, the ends of the shaft turning in bushings $j$ within tubular bearing members $k$ integral with the casing $a$. One extremity of the shaft $i$ carries a pinion $m$, which is driven from the large gear wheel $n$ on one extremity of the crank driving shaft $o$. The crank shaft $o$ extends through the upper portion of the casing parallel to the worm wheel shaft $i$, and through tubular bearings $p$ integral with the casing. The end of the crank shaft $o$ opposite the gear wheel $n$ has secured to it a clutch member $q$ adapted to be driven from a clutch member $r$ on the hub of the crank $s$, said hub being loose on the shaft $o$.

Mounted on the top of the casing is a sight feed oil cup $t$ adapted to continuously deliver oil to the goose-neck pipe $u$, whence the oil is delivered to the bearing $d$ of the worm shaft $b$. Thence the oil finds its way down to the lower bearing $c$ and thence to the reservoir.

The upper level of the oil in the reservoir extends above the lower part of the periphery of the worm wheel $h$, which, revolving at a high speed, sprays the oil, in the form of a mist, throughout the interior of the casing. In the channel formed in the cover plate $f$ is a guard $v$, which prevents the oil thrown up by the gear wheel from passing beyond it into and out of the tube $e$.

A pipe $w$ extends from the casing $a$ on a level with the lower stratum of oil in the reservoir. The outer end of the pipe $w$ is normally closed by a screw $x$. A branch pipe $y$, located outside the casing, extends up from the pipe $w$, its outwardly bent extremity being open to allow the oil in the reservoir to be continuously discharged therefrom in the same volume that oil is fed to the reservoir from the sight feed oil cup $t$. A drip shelf $z$ receives the used oil discharged from the pipe $y$. The distance above the bottom of the reservoir of the open end of pipe $y$ determines the depth of oil in the reservoir, which is thus maintained constant.

Any water or milk entering the reservoir through accident or carelessness, as well as any worn metal, dirt, or other foreign matter, being heavier than the oil, will sink to the bottom of the reservoir; and it is thus only the contaminated oil that is drawn off. By regulating the rate at which the oil is fed from the oil cup $t$, the rate at which the impurities will be drawn off may be accurately determined.

The upper wall of the inwardly projecting end of each tubular bearing member $k$ is provided with an orifice 12, through which oil dropping thereinto passes into a registering orifice 13 in the bushing $j$. Thence the oil passes to the shaft $i$ whence it spreads in both directions between the shaft and its bushing. The outwardly passing film of oil reaches a groove 14 in the shaft $i$, which groove registers with an annular groove 15 in the bushing $j$. An inclined channel 16 formed in the bushing connects the groove 15 with the interior of the casing. Thus, provision is made for maintaining the bearings of the shaft $i$ well oiled, while preventing any escape of the oil beyond the grooves 14 and 15 to the exterior of the casing.

I have not applied to the crank-shaft $o$ the means for distributing oil throughout the bearing portions of the worm wheel shaft $i$ and for insuring the return of the oil thus distributed to the interior of the casing, for the reason that the two shafts rotate at very different speeds and are also of different sizes, which give rise to different requirements; and while my invention is not limited in its application to only the worm wheel shaft of the driving mechanism of a centrifugal separator, and indeed is applicable to the lubrication of any shaft, rotating at any speed, forming part of any mechanism presenting conditions similar to those existing in the driving mechanism of a centrifugal cream separator, the invention will have its most useful application to a rapidly rotating shaft having outer bearings oiled from the inside by means of a splash oil system.

Having now fully described my invention, what I claim and desire to protect by Letters Patent is:

1. Lubricating means for the driving mechanism of centrifugal separators comprising, in combination, a casing within which the oil is adapted to be sprayed, a cross shaft extending therethrough, a bearing member carried by the casing within which an end of the shaft rotates, a bushing within the bearing member, there being registering openings through the bearing member and the corresponding bushing, an annular groove in the part of the shaft inclosed within the outer part of the bushing, and means to reconvey oil from said groove to the interior of the casing.

2. Lubricating means for the driving mechanism of centrifugal separators comprising, in combination, a casing within which the oil is adapted to be sprayed, a cross shaft extending therethrough, a bearing member carried by the casing within which an end of the shaft rotates, a bushing within the bearing member, there being registering openings through the bearing member and the corresponding bushing, an annular groove in the part of the shaft inclosed within the outer part of the bushing, and a channel extending through the bushing and communicating at one end with said groove and at the other end with the interior of the casing.

3. Lubricating means for the driving mechanism of centrifugal separators comprising, in combination, a casing within which the oil is adapted to be sprayed, a cross shaft extending therethrough, a bearing member carried by the casing within which an end of the shaft rotates, a bushing within the bearing member, there being registering openings through the bearing member and the corresponding bushing, an annular groove in the bearing face of the outer part of the bushing, an annular groove in the shaft registering with the bushing groove, and means to reconvey oil from the bushing groove to the interior of the casing.

4. Lubricating means for the driving mechanism of centrifugal separators comprising, in combination, a casing within which the oil is adapted to be sprayed, a cross shaft extending therethrough, a bearing member carried by the casing within which an end of the shaft rotates, a bushing within the bearing member, there being registering openings through the bearing member and the corresponding bushing, an annular groove in the bearing face of the outer part of the bushing, an annular groove in the shaft registering with the bushing groove, and a channel extending through the bushing from the bushing groove to the interior of the casing.

In testimony of which invention, I have hereunto set my hand, at Poughkeepsie, N. Y., on this 12th day of March, 1914.

THEODORE H. MILLER.

Witnesses:
 CHARLES L. POWELL,
 S. B. ROCKEFELLER.